United States Patent [19]

Matsumoto

[11] Patent Number: 4,515,856
[45] Date of Patent: May 7, 1985

[54] MAGNETIC RECORDING MEDIA COMPRISING TITANIUM MONOXIDE AND CARBON BLACK POWDERS IN A MAGNETIC RECORDING LAYER

[75] Inventor: Ikuo Matsumoto, Mito, Japan

[73] Assignee: Victor Company of Japan, Ltd., Japan

[21] Appl. No.: 521,173

[22] Filed: Aug. 8, 1983

[30] Foreign Application Priority Data

Aug. 9, 1982 [JP] Japan ................................ 57-137335

[51] Int. Cl.³ ............................................... B32B 5/16
[52] U.S. Cl. .................................... 428/323; 428/328; 428/694; 428/900
[58] Field of Search ............... 428/692, 694, 900, 329, 428/480, 483, 323; 252/62.55; 427/127, 131

[56] References Cited

U.S. PATENT DOCUMENTS

| 3,833,412 | 9/1974 | Akashi et al. | 252/62.54 |
|---|---|---|---|
| 3,916,039 | 10/1975 | Akashi et al. | 427/132 |
| 3,929,658 | 12/1975 | Beske | 428/329 |
| 4,047,232 | 9/1977 | Hisagen et al. | 428/900 |
| 4,117,190 | 9/1978 | Akashi et al. | 428/900 |
| 4,135,031 | 1/1979 | Akashi et al. | 428/900 |
| 4,275,115 | 6/1981 | Naruse | 428/694 |
| 4,285,825 | 8/1981 | Isobe et al. | |
| 4,379,803 | 4/1983 | Tamai et al. | 428/694 |
| 4,420,408 | 12/1983 | Kajimoto | 252/62.54 |
| 4,423,452 | 12/1983 | Kajimoto et al. | 428/694 |

FOREIGN PATENT DOCUMENTS 2941446  4/1980  Fed. Rep. of Germany.

Primary Examiner—George F. Lesmes
Assistant Examiner—William M. Atkinson
Attorney, Agent, or Firm—Lowe, King, Price & Becker

[57] ABSTRACT

Magnetic recording media comprising a combination of titanium monoxide and carbon black powders in specific amounts along with magnetic particles dispersed in a resin binder are disclosed.

6 Claims, No Drawings

MAGNETIC RECORDING MEDIA COMPRISING TITANIUM MONOXIDE AND CARBON BLACK POWDERS IN A MAGNETIC RECORDING LAYER

BACKGROUND OF THE INVENTION

1. Field of the Invention

This invention relates to magnetic recording media which have improved magnetic characteristics, and excellent abrasion resistance and travelling stability.

2. Description of the Prior Art

Magnetic recording media such as magnetic tapes should have not only good electromagnetic conversion characteristics, but also good travelling stability and good retentivity of their shape when reeled. Especially, when magnetic tapes are used in video tape recorders, they should have a low transmittance against light having a wavelength of 8000–9000 angstrom because most existing video tape recorders have a photosensor as a tape end detector.

As is well known in the art, the magnetic layer of a magnetic tape is usually composed of a magnetic powder and a binder. In order to improve characteristic properties of the magnetic layer such as an abrasion resistance, travelling stability, light transmittance and the like, various additives are added to the mixture of a magnetic powder and a binder. For instance, surface active agents or carbon black which serves as an antistatic agent are used in order to reduce the surface electric conductivity of the magnetic layer. Magnetic recording media whose magnetic layer comprises surface active agents are not favorable because their surface conductivity depends largely on an ambient humidity. In addition, surface active agents are not effective in improving the light-shielding property. On the other hand, with magnetic recording media having carbon black contained in a magnetic layer thereof, low molecular weight additives are subject to absorption by carbon black if the carbon black is used in large amounts so as to lower light transmittance. This leads to disadvantages such as lowering of electromagnetic characteristics, and deterioration of an abrasion resistance and a travelling performance of the media. The carbon black does not show its effect unless used in relatively large amounts, so that excellent electromagnetic characteristics, abrasion resistance and travelling property cannot be expected when using carbon black and surface active agent in combination.

SUMMARY OF THE INVENTION

It is accordingly an object of the present invention to provide magnetic recording media which have an improved abrasion resistance and travelling performance, and a sufficiently lowered light transmittance or good light-shielding property.

It is another object of the invention to provide magnetic recording media which comprise titanium monoxide and carbon black both as powders in a magnetic recording layer thereof relatively in small amounts whereby the packing density of a magnetic powder can be increased.

A magnetic recording medium of the invention comprises a support, and a magnetic recording layer formed on at least one side of the support as usual. The present invention is characterized by the magnetic recording layer which is made of a dispersion of a mixture of a magnetic powder, and titanium monoxide and carbon black powders in a resin binder.

DETAILED DESCRIPTION AND PREFERRED EMBODIMENTS OF THE INVENTION

The magnetic recording media of the present invention have a magnetic recording layer formed on at least one side of a support. The magnetic layer may be formed on one side or opposite sides of the support, depending on the type of medium. The magnetic recording layer is made of a magnetic powder and a mixture of a TiO powder and a carbon black powder, all dispersed throughout a resin binder.

Any known magnetic materials can be used in the practice of the invention. Examples of the magnetic materials include ferromagnetic iron oxide materials such as gamma-$Fe_2O_3$ and $Fe_3O_4$ with or without addition of other metals such as Co, Ni, Mn and the like, ferromagnetic metals such as Fe, Co, Ni and the like, and alloys thereof such as Fe-Co, Fe-Ni, Co-Ni Fe-Co-Ni with or without addition of other metals such as Al, Cr, Mn, Cu, Zn and the like. In addition, other ferromagnetic materials such as $CrO_2$ with or without other metals such as Al, Fe, Cu, Sn and the like may also be used. These ferromagnetic materials are used in the form of particles or a powder having an average size of from 0.05 to 5 microns.

It is essential in the practice of the invention to use the magnetic powder in combination with a mixture of TiO and carbon black powders. TiO is usually obtained as black cubic crystals having a specific gravity of 4.0 to 4.9, a pH of about 7.0 plus or minus 1.0, and an electric resistance of $10^{-2}$ ohm-cm. TiO is used in the form of a powder or particles having an average size of 0.01 to 5 microns, preferably 0.015 to 0.2 micron, and is used in an amount of from about 0.1 to 20 wt%, preferably about 3 to 10 wt%, of the magnetic powder or particles used. Larger sizes are undesirable because magnetic heads and metal parts of a recording and reproducing apparatus are unfavorably abraded therewith. Smaller sizes tend to lower a still reproduction characteristic.

The carbon black powder has generally an average size of from 10 to 50 millimicrons within which range the abrasion resistance, travelling performance, electromagnetic characteristics are improved with the light transmittance being effectively lowered when used in combination with the TiO powder having the above-defined range of the average size. The carbon black useful for the purpose of the invention may be obtained from any sources and should not be limited to any specific type of carbon black. The amount of carbon black is in the range of about 1 to 10 wt%, preferably about 1 to 5 wt%, of the magnetic powder used.

In both the TiO and carbon black, if amounts used are smaller than defined above, little effect of addition of these ingredients is shown. On the contrary, amounts larger than defined above are disadvantageous because electromagnetic characteristics of the resulting recording medium become poor.

Magnetic particles and a mixture of TiO and carbon black powders are dispersed in a binder dissolved in a solvent. The resulting dispersion is applied to a support, followed by drying, calendering and curing as usual to form a magnetic recording layer on the support.

Useful binders are any known thermoplastic resins, thermosetting resins, and mixtures thereof. Typical examples of the thermoplastic resins include vinyl chloride-vinyl acetate copolymers, vinyl chloride-vinylidene chloride copolymers, acrylic ester-styrene copolymers, methacrylic ester-styrene copolymers, acrylic ester-vinylidene chloride copolymers, methacrylic ester-vinylidene chloride copolymers, urethane elastomers, cellulose derivatives, vinyl chloride-vinyl acetate vinyl acetate terpolymers, and various other synthetic resins. Examples of the thermosetting resins include phenolic resins, epoxy resins, curable polyurethane resins, urea resins, melamine resins, alkyd resins, silicone resins, urea-formaldehyde resins, mixtures of isocyanates and polyols, and the like. These binder resins may be used singly or in combination. Typical solvents for these binders are aromatic compounds such as xylene, toluene and the like, ketones such a methyl ethyl ketone, methyl isobutyl ketones and the like, and mixtures thereof.

The dispersion of magnetic particles, and TiO and carbon black powders in a resin may further comprise known additives such as dispersing agents, lubricants, abrasive agents, antistatic agents, and the like. These additives are well known and are not necessarily essential for the purpose of the invention. So, these additives are not particularly described herein.

In order to manufacture a magnetic recording medium of the invention, predetermined amounts of magnetic particles, and TiO and carbon black powders are dispersed in a binder and a solvent along with suitable additives, for example, by milling them as usual. The resulting dispersion is then coated onto a non-magnetic support on at least one side thereof. The coating is subsequently dried, calendered, and cured under conditions which depend on the type of binder used. The coating may be effected by any known techniques. The resulting recording layer has generally a thickness of 0.5 to 12 microns after calendering. It is to be noted that TiO and carbon black particles used should have average sizes within the defined ranges provided that the sizes do not preferably exceed a thickness of a final magnetic layer. It should also be noted that magnetic particles are usually used in an amount of 200 to 800 parts by weight per 100 parts by weight of a binder, which may, more or less, vary depending on the type of recording medium.

Supports suitable for the present invention include films, foils, or sheets of a variety of materials including, for example, synthetic or semi-synthetic resins such as polyesters, polyolefins, cellulose derivatives, etc. metals such as aluminium, copper and the like, and glasses or ceramics.

The present invention is particularly described by way of examples.

EXAMPLE 1

One hundred parts by weight of Co-containing gamma-$Fe_2O_3$, 10 parts by weight of vinyl chloride-vinyl acetate copolymer, 10 parts by weight of polyurethane resin, 2 parts by weight of a lubricant, 5 parts by weight of titanium monoxide particles having an average size of 0.2 micron, 1 part by weight of carbon black particles having an average size of 30 millimicrons, and 250 parts by weight of a mixed solvent of methyl ethyl ketone, toluene, and methyl isobutyl ketone were placed and dispersed in a sand mill. To the dispersion was added an isocyanate curing agent, followed by uniformly mixing and filtering to remove foreign matters from the dispersion. This dispersion was fed to a coater and applied onto a polyester film. The applied dispersion was dried, calendered to render the surface smooth, and heated at about 55° C. for 24 hours and slit into ½ inch wide magnetic tapes for video recording purposes. The recording layer had a thickness of 5 microns after calendering.

EXAMPLE 2

The general procedure of Example 1 was repeated using 3 parts by weight of titanium monoxide and 1 part by weight of carbon black, both having the same sizes as used in Example 1, thereby obtaining magnetic tapes.

EXAMPLE 3

The general procedure of Example 1 was repeated using 3 parts by weight of titanium monoxide particles having an average size of 0.05 microns and 1 part by weight of carbon black particles having the same average size as used in Example 1, thereby obtaining magnetic tapes.

COMPARATIVE EXAMPLE 1

The general procedure of Example 1 was repeated except that no titanium monoxide was used but 6 parts by weight of carbon black was used, thereby obtaining magnetic tapes.

COMPARATIVE EXAMPLE 2

The general procedure of Example 2 was repeated except that no carbon black was used, but 4 parts by weight of the titanium monoxide particles was used, thereby obtaining magnetic tapes.

COMPARATIVE EXAMPLE 3

The general procedure of Example 3 was repeated except that no carbon black was used, but 4 parts by weight of the titanium monoxide was used, thereby obtaining magnetic tapes.

The magnetic tapes obtained in Examples 1 through 3 and Comparative Examples 1 through 3 were subjected to the measurement of a surface resistivity. As a result, it was found that the magnetic tapes of Examples 1 through 3 had the resistivity in the order of $10^7$ ohms, but the magnetic tapes of Comparative Examples 1 through 3 were in the order of $10^8$ to $10^9$ ohms with respect to the surface resistivity. These results reveal that combinations of titanium monoxide and carbon black particles are effective in lowering the surface resistivity and have thus an antistatic effect. When the magnetic tapes of the invention are repeatedly travelled, the reeled tapes are better in shape than the tapes of the comparative examples.

Further, the measurement of a light transmittance at a wavelength of 800 nonameter reveals that the light transmittance ranges from 0.001 to 0.005% for the magnetic tapes of Example 1 through 3 whereas it is about 0.01% for the magnetic tapes of Comparative Examples 1 through 3. Thus, the light transmittance of the tapes of the present invention is much lower than the light transmittance of the magnetic tapes of Comparative Examples. When the tapes of the invention are used in a recording and reproducing apparatus in which the tape end is detected by a photosensor, malfunction of a tape end detector can barely take place.

Moreover, each of the magnetic tapes of the Examples and Comparative Examples was brought into contact with a rotary drum under which it was repeatedly travelled several hundreds times. The coefficient of kinetic friction of each tape after or prior to the travelling test was measured. This measurement reveals that the coefficient of kinetic friction is changed from about 0.24 to about 0.3 for the magnetic tapes of Examples 1 through 3 and from about 0.25 to about 0.4 for the magnetic tapes for Comparative Examples 1 through 3. Thus, it will be seen that combinations of titanium monoxide and carbon black are effective in improving abrasion resistance of magnetic tapes.

The S/N ratio of each of the magnetic tapes of Examples 1 through 3 and Comparative Example 1 was measured using a luminance signal or video Y signal, with the result that all the tapes of the present invention are higher by about 0.5 than the magnetic tape of the Comparative Example.

EXAMPLE 4

The general procedure of Example 1 was repeated using different average size of carbon black particles ranging from 1 to 70 millimicrons, thereby obtaining magnetic tapes.

These tapes were subject to the measurement of the surface resistivity, coefficient of kinetic friction, and light transmittance. As a result, it was found that the surface resistivity was in the order of $10^7$ ohms for an average size below 10 microns, in the form of $10^8$ ohms for an average size from 10 to 50 microns, and in the order of $10^9$ ohms when the average size exceeded 50 microns. Similarly, the coefficient of kinetic friction was in the range over 0.5 when the average size was below 10 microns, in the range of from 0.3 to 0.5 when the average size was in the range of from 10 to 50 microns, and in the range below 0.3 when the size exceeded 50 microns. The light transmittance was over 0.04 when the size was in the range below 10 microns, in the range of from 0.02 to 0.04 when the size was in the range of from 10 to 50 microns, and in the range below 0.02 when the size exceeded 50 microns. From the above results, the carbon black particles are determined to have an average size ranging from 10 to 50 millimicrons though larger or smaller sizes may be used.

Although magnetic recording tapes are described in the above examples, combinations of titanium monoxide and carbon black particles may be applied to any other magnetic recording media such as magnetic discs, magnetic cards, and the like.

What is claimed is:

1. A magnetic recording medium comprising a support, and a magnetic recording layer formed on at least one side of said support, said magnetic recording layer comprising a dispersion of magnetic particles, and a mixture of about 0.1 to 20 weight percent of a titanium monoxide powder and about 1 to 10 weight percent of a carbon black powder, both based on said magnetic particles, in a resin binder, wherein the titanium monoxide and carbon black powders have average particle sizes of from 0.01 to 5 microns and from 13 to 50 millimicrons, respectively.

2. A magnetic recording medium according to claim 1, wherein said support has the magnetic recording layer on one side thereof.

3. A magnetic recording medium according to claim 1, wherein said support has the magnetic recording layer on each side thereof.

4. A magnetic recording medium according to claim 1, wherein the amounts of the titanium monoxide and carbon black powders are, respectively, in ranges of from about 3 to 10 wt% and from about 1 to 5 wt% of said magnetic particles.

5. A magnetic recording medium according to claim 1 wherein said magnetic recording layer consists essentially of a dispersion of magnetic particles, and a mixture of about 0.1 to 20 weight percent of a titanium monoxide powder and about 1 to 10 weight percent of a carbon black powder, both based on the amount of said magnetic particles, in a resin binder.

6. A magnetic recording medium according to claim 1 wherein the titanium monoxide powder comprises black cubic crystals having a specific gravity of 4.0 to 4.9, a pH of $7.0\pm1.0$ and an electric resistance of $10^{-2}$ ohm-cm.

* * * * *